United States Patent
Narasimha et al.

(12) 
(10) Patent No.: US 12,004,071 B2
(45) Date of Patent: Jun. 4, 2024

(54) USER EQUIPMENT LAYER 2 BUFFER OPERATION IN IAB NETWORKS

(71) Applicant: Apple Inc., Cupertino, CA (US)

(72) Inventors: Murali Narasimha, San Ramon, CA (US); Ralf Rossbach, Munich (DE); Sarma V. Vangala, Campbell, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 17/656,943

(22) Filed: Mar. 29, 2022

(65) Prior Publication Data

US 2022/0322204 A1    Oct. 6, 2022

Related U.S. Application Data

(60) Provisional application No. 63/200,890, filed on Apr. 1, 2021.

(51) Int. Cl.
*H04W 40/24* (2009.01)
*H04W 28/02* (2009.01)
*H04W 88/14* (2009.01)

(52) U.S. Cl.
CPC ..... *H04W 40/248* (2013.01); *H04W 28/0257* (2013.01); *H04W 88/14* (2013.01)

(58) Field of Classification Search
CPC  H04W 40/248; H04W 28/0257; H04W 88/14
See application file for complete search history.

(56) References Cited

U.S. PATENT DOCUMENTS

| | | | |
|---|---|---|---|
| 10,567,954 B2* | 2/2020 | Novlan | H04W 24/02 |
| 11,368,895 B2* | 6/2022 | Lu | H04W 36/30 |
| 2003/0073443 A1* | 4/2003 | Bae | H04W 28/22 370/231 |
| 2020/0068456 A1* | 2/2020 | Humbert | H04L 41/0677 |
| 2021/0243636 A1* | 8/2021 | Zhuo | H04B 7/15528 |
| 2021/0259051 A1* | 8/2021 | Latheef | H04W 24/02 |
| 2022/0053370 A1* | 2/2022 | Zhuo | H04W 28/0284 |

FOREIGN PATENT DOCUMENTS

| | | |
|---|---|---|
| EP | 3955630 | 2/2022 |
| WO | 2020/031154 | 2/2020 |
| WO | 2020/221296 | 11/2020 |

OTHER PUBLICATIONS

Huawei et al., "QoS parameters for IAB QoS handling", 3GPP TSG RAN W3#101bis, R3-186000, Oct. 12, 2018, 3 sheets.

* cited by examiner

*Primary Examiner* — Rasheed Gidado
(74) *Attorney, Agent, or Firm* — Fay Kaplun & Marcin, LLP

(57) ABSTRACT

A user equipment (UE) is configured to access a first base station in a network via an access link, wherein the first base station is an integrated access and backhaul (IAB) node in a first IAB network topology connected to a second base station via one or more backhaul links, wherein the second base station is an IAB-donor for the first base station, report, to the first base station, information for reducing a maximum data rate for the UE when the UE is deployed in one or more IAB network topologies and receive data packages with a reduced maximum data rate based on the reported information.

18 Claims, 14 Drawing Sheets

Table 700

| Scenario | Backhaul | Access | Reduction of max data rate assuming 1 backhaul link | Reduction of max data rate assuming 2 backhaul links | Reduction of max data rate assuming 3 backhaul links |
|---|---|---|---|---|---|
| IAB nodes in NR standalone | FR1 | FR1 | | | |
| | | FR2 | | | |
| | | FR1+FR2 | | | |
| | FR2 | FR1 | | | |
| | | FR2 | | | |
| | | FR1+FR2 | | | |
| | FR1+FR2 | FR1 | | | |
| | | FR2 | | | |
| | | FR1+FR2 | | | |
| IAB nodes in EN-DC | FR1 (NR) | FR1 (NR) | | | |
| | | FR2 (NR) | | | |
| | | FR1+FR2 (NR) | | | |
| | FR2 (NR) | FR1 (NR) | | | |
| | | FR2 (NR) | | | |
| | | FR1+FR2 (NR) | | | |
| | FR1+FR2 (NR) | FR1 (NR) | | | |
| | | FR2 (NR) | | | |
| | | FR1+FR2 (NR) | | | |

Fig. 7

USER EQUIPMENT LAYER 2 BUFFER OPERATION IN IAB NETWORKS

PRIORITY CLAIM/INCORPORATION BY REFERENCE

This application claims priority to U.S. Provisional Application Ser. No. 63/200,890 entitled "User Equipment Layer 2 Buffer Operation in IAB Networks" filed on Apr. 1, 2021, the entirety of which is incorporated by reference herein.

BACKGROUND INFORMATION

An integrated access and backhaul (IAB) network may be used in a 5G deployment to provide wireless backhauling for next generation Node Bs (gNBs) that are not directly connected to the 5G core network (5GC). A parent IAB-donor (IAB-parent) may provide wireless backhauling for an IAB-node, which may in turn provide wireless backhauling for a child IAB-node (IAB-child). The IAB-node and the IAB-child may provide wireless access to access user equipment (UEs) and backhaul certain data from the access UEs to the IAB-parent.

The Layer 2 (L2) buffer at a UE allows for reordering of data received out of order at the UE and is dimensioned based on a round trip time (RTT) for the NR data path and a maximum data rate. In an IAB arrangement, the effective RTT for a data transmission can be significantly higher than a non-IAB arrangement, particularly when multiple backhaul links are traversed. A UE designed based on the standard RLC RTT values can experience buffer overflows in an IAB network, which may result in packets being dropped by the UE even when radio conditions are good.

SUMMARY

Some exemplary embodiments are related to a processor of a user equipment (UE) configured to perform operations. The operations include accessing a first base station in a network via an access link, wherein the first base station is an integrated access and backhaul (IAB) node in a first IAB network topology connected to a second base station via one or more backhaul links, wherein the second base station is an IAB-donor for the first base station, reporting, to the first base station, information for reducing a maximum data rate for the UE when the UE is deployed in one or more IAB network topologies and receiving data packages with a reduced maximum data rate based on the reported information.

Other exemplary embodiments are related to a user equipment (UE) having a transceiver configured to communicate with a network and a processor communicatively coupled to the transceiver and configured to perform operations. The operations include accessing a first base station in a network via an access link, wherein the first base station is an integrated access and backhaul (IAB) node in a first IAB network topology connected to a second base station via one or more backhaul links, wherein the second base station is an IAB-donor for the first base station, reporting, to the first base station, information for reducing a maximum data rate for the UE when the UE is deployed in one or more IAB network topologies and receiving data packages with a reduced maximum data rate based on the reported information.

Still further exemplary embodiments are related to a processor of a first base station in a network configured to perform operations. The operations include communicating with a user equipment (UE) via an access link, wherein the first base station is an integrated access and backhaul (IAB) node in a first IAB network topology connected to a second base station via one or more backhaul links, wherein the second base station is an IAB-donor for the first base station, receiving, from the UE, reported information for reducing a maximum data rate for the UE when the UE is deployed in one or more IAB network topologies and transmitting data packages to the UE with a reduced maximum data rate when, based on the reported information.

BRIEF DESCRIPTION OF THE DRAWINGS

FIG. 7 shows a table for reducing a maximum data rate of a user equipment (UE) for different IAB topologies according to various exemplary embodiments.

DETAILED DESCRIPTION

Figure 1:
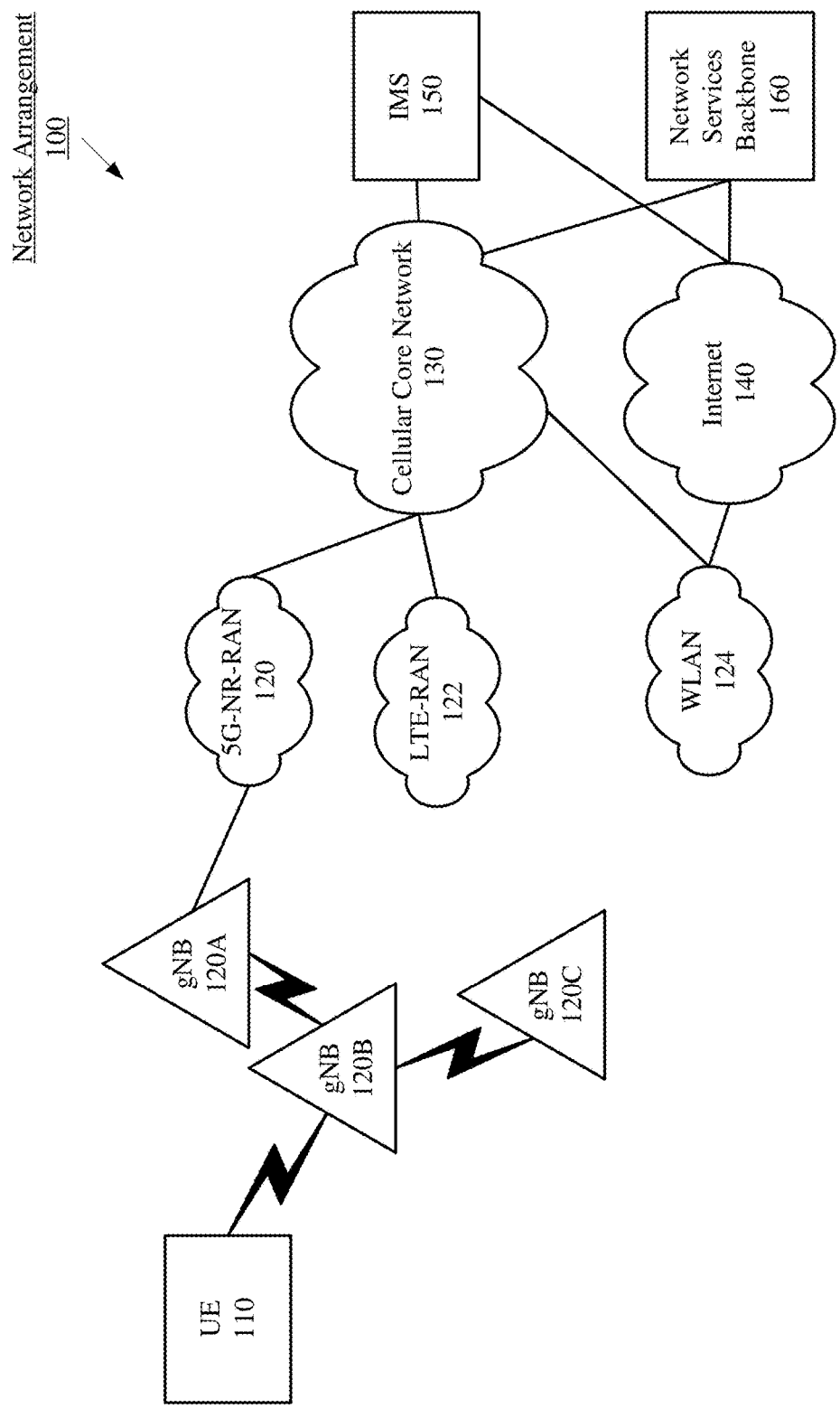
FIG. 1 shows a network arrangement according to various exemplary embodiments.

The exemplary embodiments may be further understood with reference to the following description and the related appended drawings, wherein like elements are provided with the same reference numerals. The exemplary embodiments describe operations for mitigating layer 2 (L2) buffer issues for user equipment (UE) in an integrated access and backhaul (IAB) network.

The L2 buffer at the UE is used for reordering data received out of order at the UE. During IAB operation, downstream data packets may traverse multiple radio links before reaching the UE, which increases the likelihood that, by the time the packets reach the UE, a high number of packets may be out of order relative to the order in which they were transmitted. During IAB operation the L2 buffer can become overloaded when a high number of packets are received from the access IAB-node out of their original transmission order.

According to some exemplary embodiments, the UE is configured to report, to the network, information for IAB topologies in which, if the UE is currently in one of the designated IAB topologies, the network should reduce the maximum data rate allowed for data transmissions to the UE. The UE may indicate various reduction values for the network to apply, based on the UE capabilities.

According to further exemplary embodiments, the IAB-node performs reordering operations. In some exemplary embodiments, any IAB-node in the IAB arrangement may perform reordering. In other exemplary embodiments, only the access IAB-node servicing the access UE performs the reordering. These exemplary embodiments and further operations will be described in detail below.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network arrangement 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary embodiments, the UE 110 may establish a connection with the 5G NR-RAN 120.

The 5G NR-RAN 120 and the LTE-RAN 122 may be portions of cellular networks that may be deployed by cellular providers (e.g., Verizon, AT&T, I-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A, the gNB 120B, and/or the gNB 120C. The gNBs 120A-C may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to three gNBs 120A-C is merely for illustrative purposes. The exemplary embodiments may apply to any appropriate number of gNBs.

In addition to the networks 120, 122 and 124 the network arrangement 100 also includes a cellular core network 130, e.g., a 5GC, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In the network arrangement 100 of FIG. 1, the gNBs 120A-C are in an integrated access and backhaul (IAB) arrangement, wherein only the gNB 120A has direct connectivity with the cellular core network 130, e.g., the 5GC, via the 5G-NR-RAN 120. To be described in further detail below, the gNB 120A is considered a parent IAB, or an IAB-donor, in the IAB arrangement and provides core network access for backhaul traffic from the gNBs 120B and 120C. The gNBs 120B and 120C are considered IAB-nodes and do not have direct connectivity with the core network 130. The gNB 120B is in communication with the gNB 120A via parent links, e.g., a parent UL and a parent DL. The gNB 120C is considered a child IAB of the gNB 120B, and is in communication with gNB 120B via child links, e.g., a child UL and a child DL. Additionally, the UE 110 is in communication with the gNB 120B via access links, e.g., an access UL and an access DL.

It will be understood by those skilled in the art that the IAB arrangement described above is only exemplary, and that additional gNBs and/or access UEs may be included in an IAB arrangement. The principles and operations described herein for the exemplary network arrangement 100 may be applied to other arrangements. For example, as will be described further below, an IAB topology may include additional 5G backhaul links in a standalone (SA) IAB arrangement, or may include additional LTE backhaul links in a non-standalone (NSA) IAB arrangement.

Figure 2:
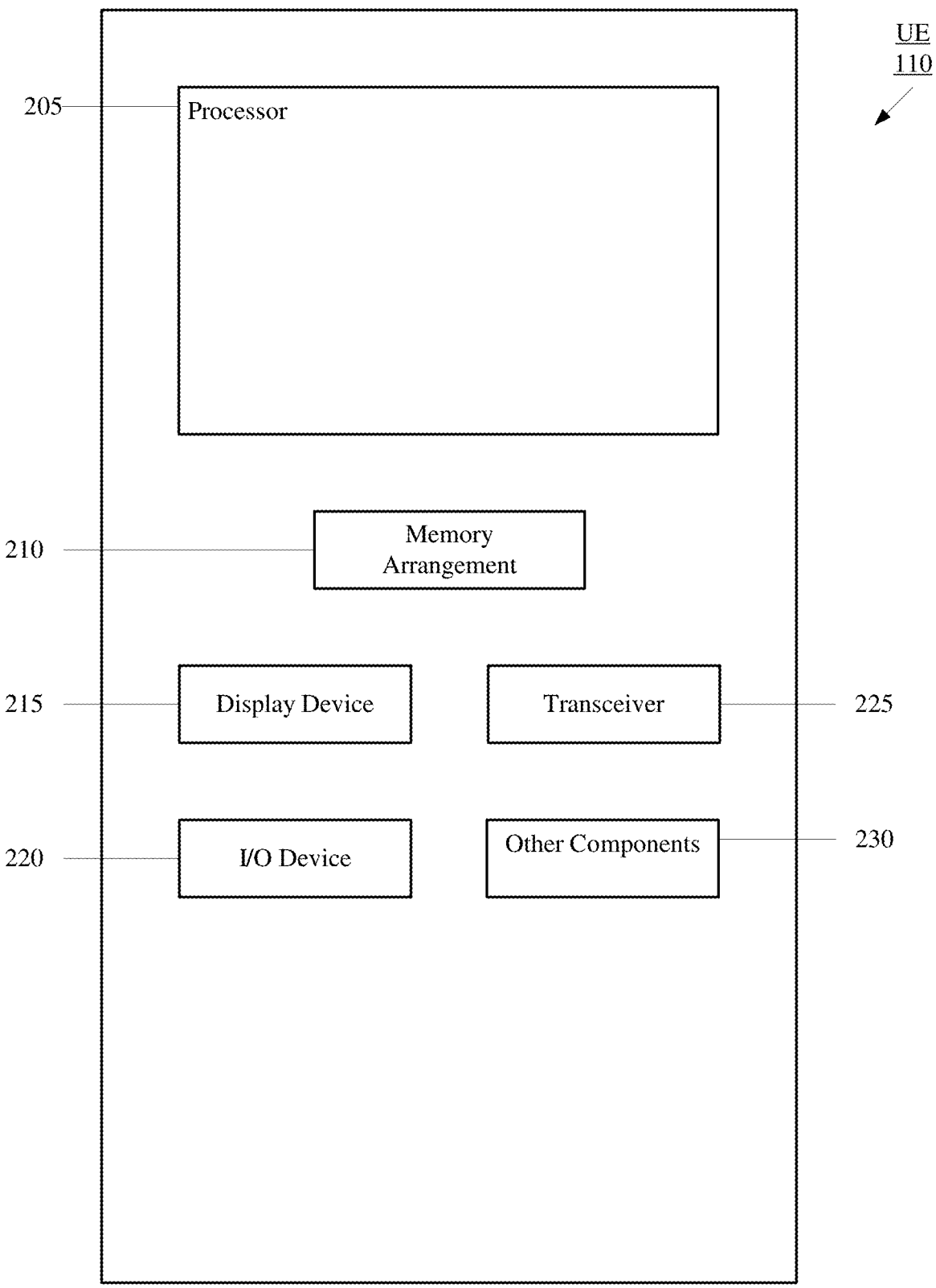
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute operations for accessing the 5G NR-RAN 120 via one or more the gNBs 120A-C. According to the exemplary embodiments described herein, the processor 205 may be configured to execute operations including reporting information to the network for managing a maximum data rate for the UE during certain IAB deployments.

In addition to the processor 205, various UE functionalities may be implemented via a separate incorporated component of the UE 110 or a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
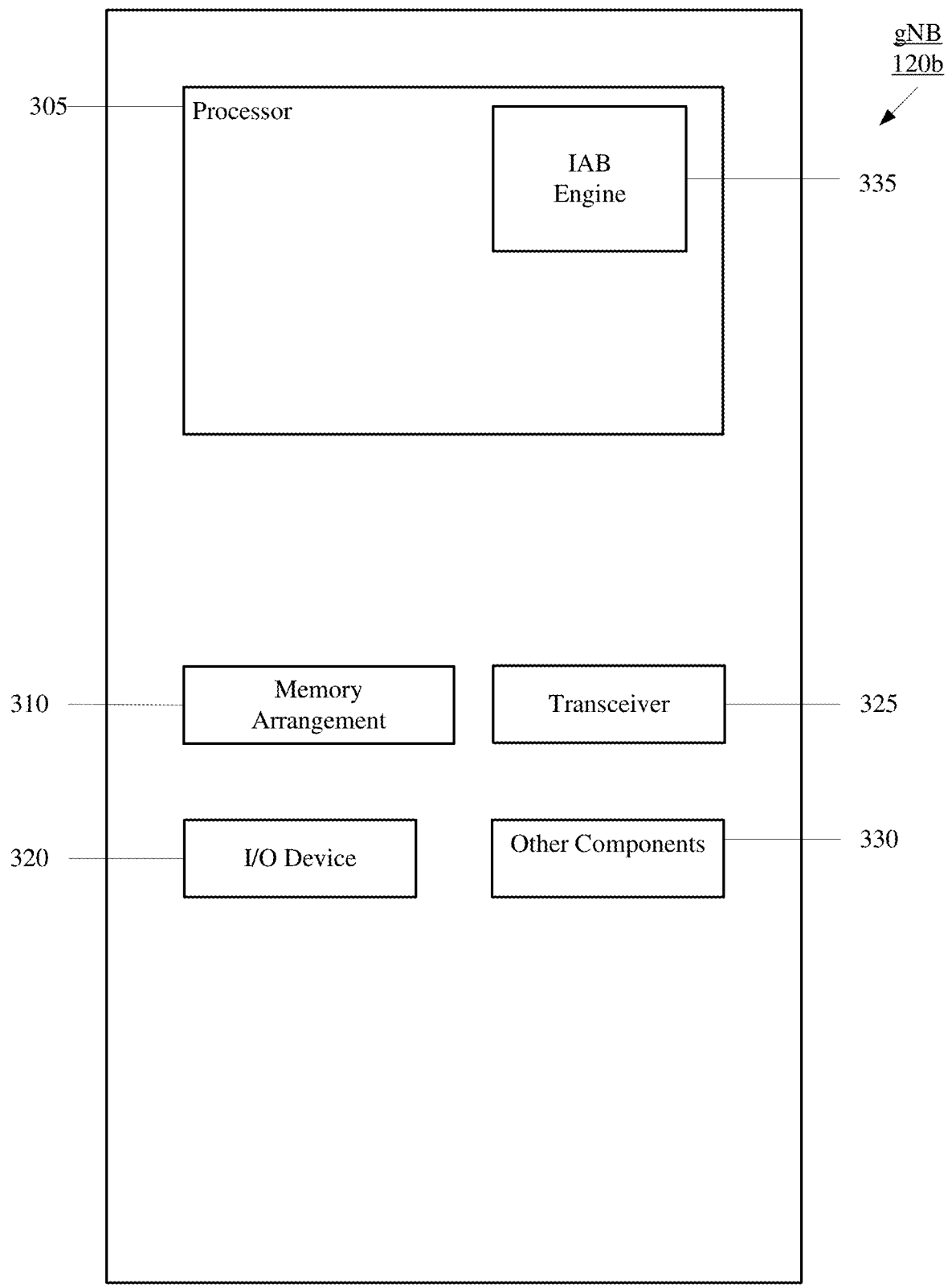
FIG. 3 shows an exemplary network cell according to various exemplary embodiments.

FIG. 3 shows an exemplary network cell, in this example gNB 120B, according to various exemplary embodiments. As noted above with regard to the UE 110, the gNB 120B may represent a serving cell for the UE 110. The gNB 120B may represent any access node of the 5G NR network through which the UEs 110 may establish a connection and manage network operations. The gNB 120B may also represent an IAB-node in an IAB arrangement, as described above with respect to FIG. 1.

The gNB 120B may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120B to other electronic devices, etc.

The processor 305 may be configured to execute a plurality of engines of the gNB 120B. For example, the engines may include an IAB engine 335. The IAB engine 335 may perform operations for receiving data packets on a backhaul link and reordering the data packets prior to transmission further upstream or downstream, to be described in detail below. Certain functionalities of the IAB engine 335 may be executed at separate components of the gNB 120B, specifically a mobile termination (MT) unit and a distributed unit (DU). The IAB-MT and the IAB-DU, to be described further below with respect to FIG. 4, manage traffic upstream in the IAB topology and downstream in the IAB topology, respectively. Thus, data packets received at the IAB-MT may be sent to the IAB-DU for transmission further downstream, and data packets received at the IAB-DU may be sent to the IAB-MT for transmission further upstream.

For the IAB-node (gNB 120B), an IAB-MT is configured for communications with the parent-IAB including receiving DL communications and transmitting UL communications, and an IAB-DU is configured for communications with the IAB-child (gNB 120C) and any access UEs including transmitting DL communications and receiving UL communications. For the IAB-child (gNB 120C), the MT is configured for communications with the IAB-node (gNB 120B) and the DU is configured for communications with access UEs. The IAB-parent (gNB 120A) at least includes the DU for communications with the IAB-MT, but may further include the MT for communications with a further IAB-parent.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory arrangement 310 may be a hardware component configured to store data related to operations performed by the UE 110. The I/O device 320 may be a hardware component or ports that enable a user to interact with the gNB 120A. The transceiver 325 may be a hardware component configured to exchange data with the UE 110 and any other UE in the network arrangement 100, e.g., if the gNB 120A serves as a PCell or an SCell to the UE 110. The transceiver 325 may operate on a variety of different frequencies or channels (e.g., set of consecutive frequencies). Therefore, the transceiver 325 may include one or more components (e.g., radios) to enable the data exchange with the various networks and UEs.

IAB Operation for an Access TIE

Integrated Access and Backhaul (IAB) is a layer-2 relay technology introduced in 3GPP NR Release 16. An integrated access and backhaul (IAB) network may be used in a 5G deployment to provide a wireless backhauling functionality for next generation Node Bs (gNBs) that are not directly connected to the 5G core network (5GC). A parent IAB-donor (IAB-parent) may provide wireless backhauling for an IAB-node, which may in turn provide wireless backhauling for a child IAB-node (IAB-child). The IAB-node and the IAB-child may provide wireless access to access user equipment (UEs) and backhaul certain data from the access UEs to the IAB-parent.

Figure 4:
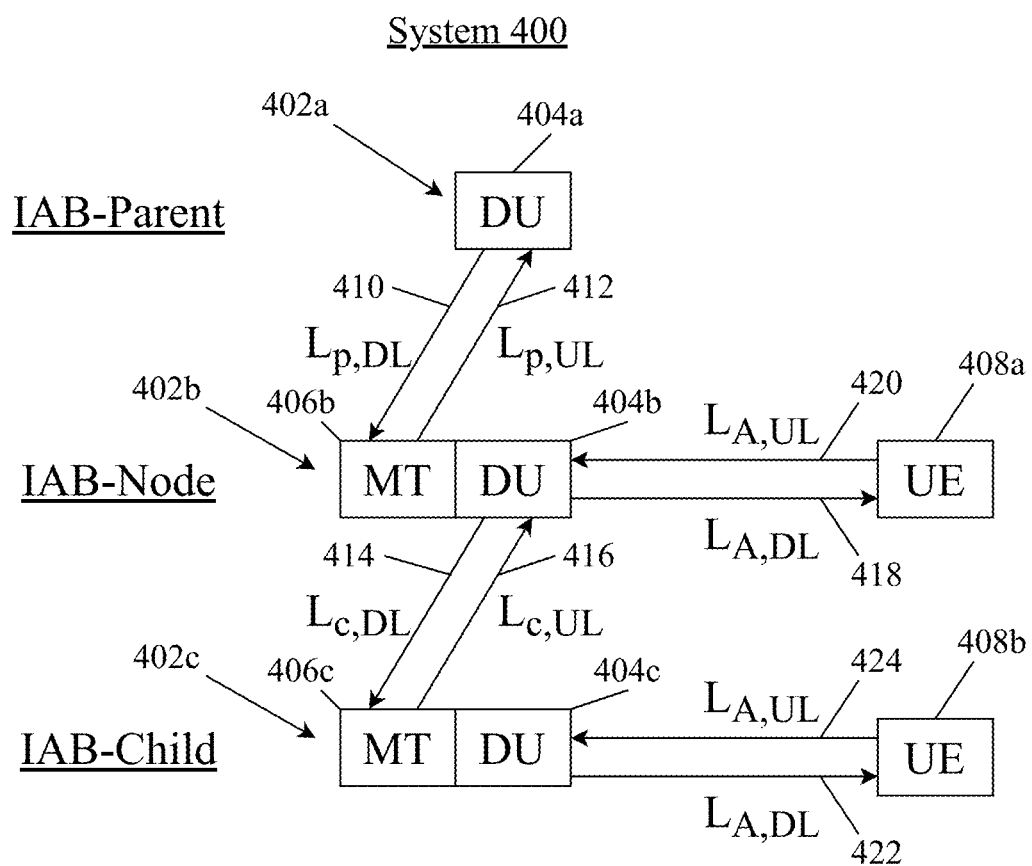
FIG. 4 shows an exemplary system for integrated access and backhaul (IAB) comprising a plurality of next generation NodeBs (gNBs) according to various exemplary embodiments.

FIG. 4 shows an exemplary system 400 for integrated access and backhaul (IAB) comprising a plurality of next generation NodeBs (gNBs) 402. Three gNBs 402 are shown in FIG. 4, however the IAB system may include any number of gNBs. In this example, the gNB 402a serves as the parent IAB-donor (IAB-parent) and has fiber connectivity to the 5G core network (5GC) and wireless connectivity to the gNB 402b (IAB-node). The IAB-parent 402a provides an interface to the 5GC and wirelessly backhauls UE access traffic for UEs in communication with the gNB 402b. The gNB 402b is an IAB-node and has wireless connectivity to the gNB 402a, the gNB 402c, and a first access UE 408a. The gNB 402c is a child IAB-node and has connectivity to the gNB 402b and a second access UE 408b. The IAB-nodes 402b, 402c support wireless access to UEs and wirelessly backhaul the access traffic to the IAB-parent 402a.

Each of the IAB-nodes 402b, 402c in the system 400 is equipped with IAB-node functionality, and thus includes a distributed unit (DU) 404 and a mobile termination (MT) 406. The IAB-donor is considered a single logical node comprising a set of functions such as a DU, a central unit-control plane (CU-CP), a central unit-user plane (CU-UP), and potentially other functions. It will be understood by persons skilled in the art that further gNBs may be included in an IAB system and may be linked to the gNBs 402 via further backhaul links in either the upstream or downstream direction.

In the system 400, the DU 404a of the IAB-parent 402a communicates with the MT 406b of the IAB-node 402b on a backhaul link 410, e.g., the parent downlink ($L_{p,DL}$) and a backhaul link 412, e.g., the parent uplink ($L_{p,UL}$). The DU 404b of the IAB-node 402b communicates with the MT 406c of the IAB-child 402c on a backhaul link 414, e.g., the child downlink ($L_{c,DL}$) and a backhaul link 416, e.g., the child uplink ($L_{c,UL}$). The DU 404b of the IAB-node 402b additionally communicates with the first access UE 408a on an access link 418, e.g., the access downlink ($L_{A,DL}$) and an access link 420 e.g., the access uplink ($L_{A,DL}$). The DU 404c of the IAB-node 402c additionally communicates with the second access UE 408b on an access link 422, e.g., the access downlink ($L_{A,DL}$) and an access link 424 e.g., the access uplink ($L_{A,UL}$).

Figure 5A:
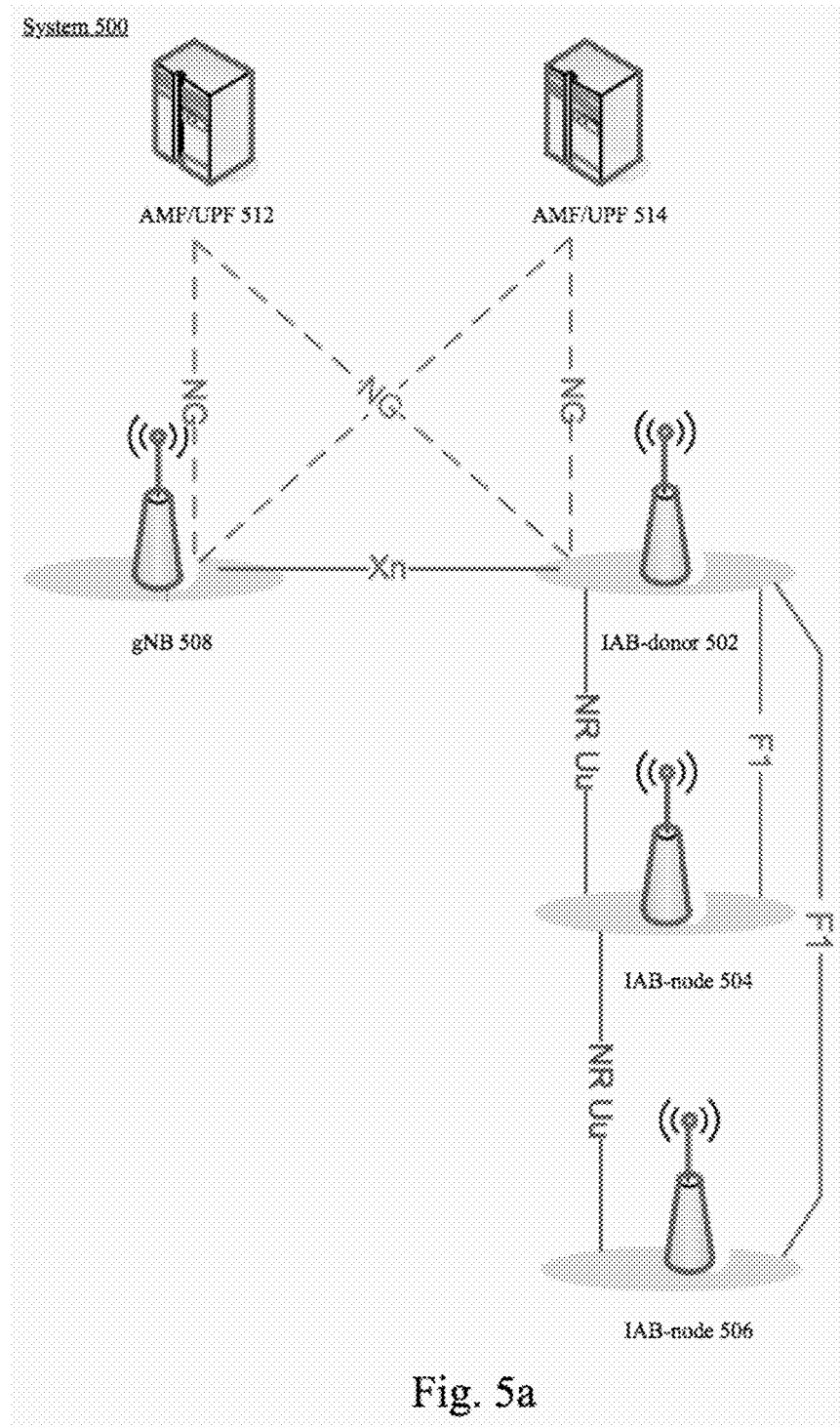
FIG. 5a shows an IAB system in NR standalone (SA) mode according to various exemplary embodiments.

FIG. 5a shows an integrated access and backhaul (IAB) system 500 in NR standalone (SA) mode. In SA mode, the IAB-nodes in the system are connected only to NR. That is, each of the IAB-nodes in an SA IAB system has an upstream backhaul link to an IAB-donor gNB and may additionally have a downstream backhaul link to a further IAB-node. However, none of the IAB-nodes in an SA IAB system have backhaul links to nodes from other networks, e.g., eNBs for an LTE network.

In FIG. 5a, the gNBs 504 and 506 are IAB-nodes served by the IAB-donor gNB 502, and the IAB-node 506 is a child node of the IAB-node 504. The IAB-donor 502 and the IAB-node 504 communicate via a parent backhaul link, and the IAB-node 504 and the IAB-node 506 communicate via a child backhaul link. The backhaul links comprise modified versions of the NR Uu protocol stack. The IAB-donor 502 additionally communicates with the IAB-node 504 and the IAB-node 506 directly via the F1 interface. The F1 interface facilitates inter-connection of a gNB-CU (of e.g., the IAB-donor) and a gNB-DU (of e.g., the IAB-nodes) and supports procedures to establish, maintain and release radio bearers for the NG-RAN part of PDU sessions. The F1 interface further supports the separation of each UE on the protocol level for user specific signaling management and the transfer of RRC signaling messages between the UE and the gNB-CU.

The IAB-donor 502 is shown as having connectivity to the AMF/UPF, e.g., AMF/UPF instances 512 and 514, via the NG interface. The IAB-donor 502 can also communicate with additional gNBs, e.g., gNB 508, via the Xn interface.

Figure 5B:
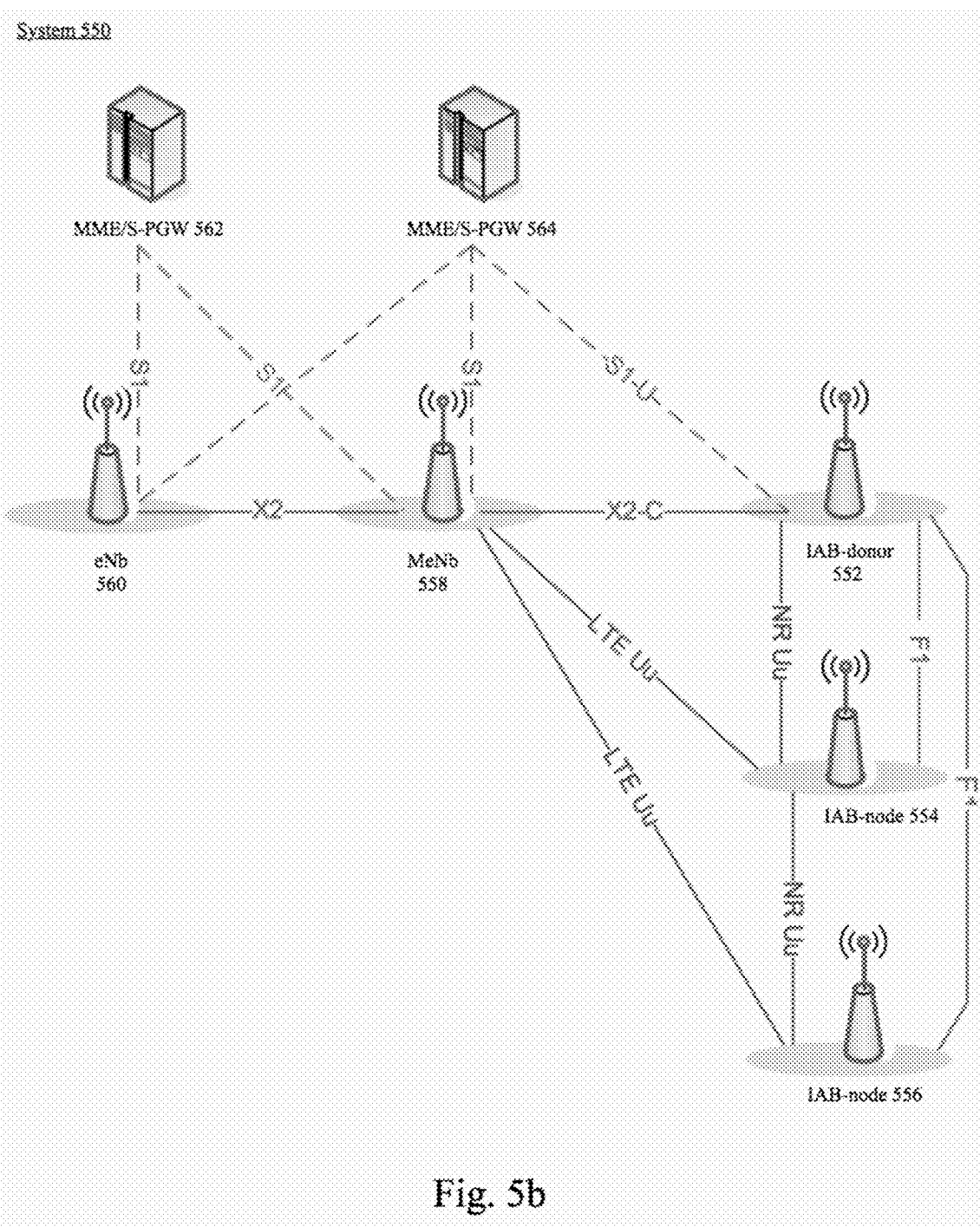
FIG. 5b shows an IAB system in non-standalone (NSA) mode according to various exemplary embodiments.

FIG. 5b shows an IAB system 550 in non-standalone (NSA) mode. In NSA mode, the IAB-nodes in the IAB system are connected to NR and one or more of the IAB-nodes is additionally connected to an LTE node. That is, each of the IAB-nodes in a NSA IAB system has a backhaul link to a parent IAB-donor gNB or a further IAB-node, and one or more of the IAB-nodes further includes a backhaul link to an eNB for an LTE network.

In FIG. 5b, the gNBs 554 and 556 are IAB-nodes served by the IAB-donor gNB 552, and the IAB-node 556 is a child node of the IAB-node 554. Similar to FIG. 5a, the IAB-donor 552 and the IAB-node 554 communicate via a parent backhaul link, and the IAB-node 554 and the IAB-node 556 communicate via a child backhaul link. The IAB-donor 552 additionally communicates with the IAB-node 554 and the IAB-node 556 directly via the F1 interface.

The IAB-node 554, 556 each have an additional backhaul link to master eNB (MeNB) 558 via LTE backhaul links comprising modified versions of the NR Uu protocol stack. The IAB-donor 552 can communicate with the MeNB 558 via the X2-C interface. The MeNB 558 is connected to the MME/S-PGW of the LTE network, e.g., MME/S-PGW instances 562 and 564, via the S1 interface, and can communicate with further eNBs, e.g., eNB 560, via the X2 interface. The IAB-donor 552 is also connected to the MME/S-PGW instance NUM via the S1-U interface.

Regardless of the particular IAB arrangement being deployed, a UE being served by an IAB node has no knowledge that it is being served by the IAB node. That is, the IAB protocols and operation are transparent to the UE.

Figure 6:
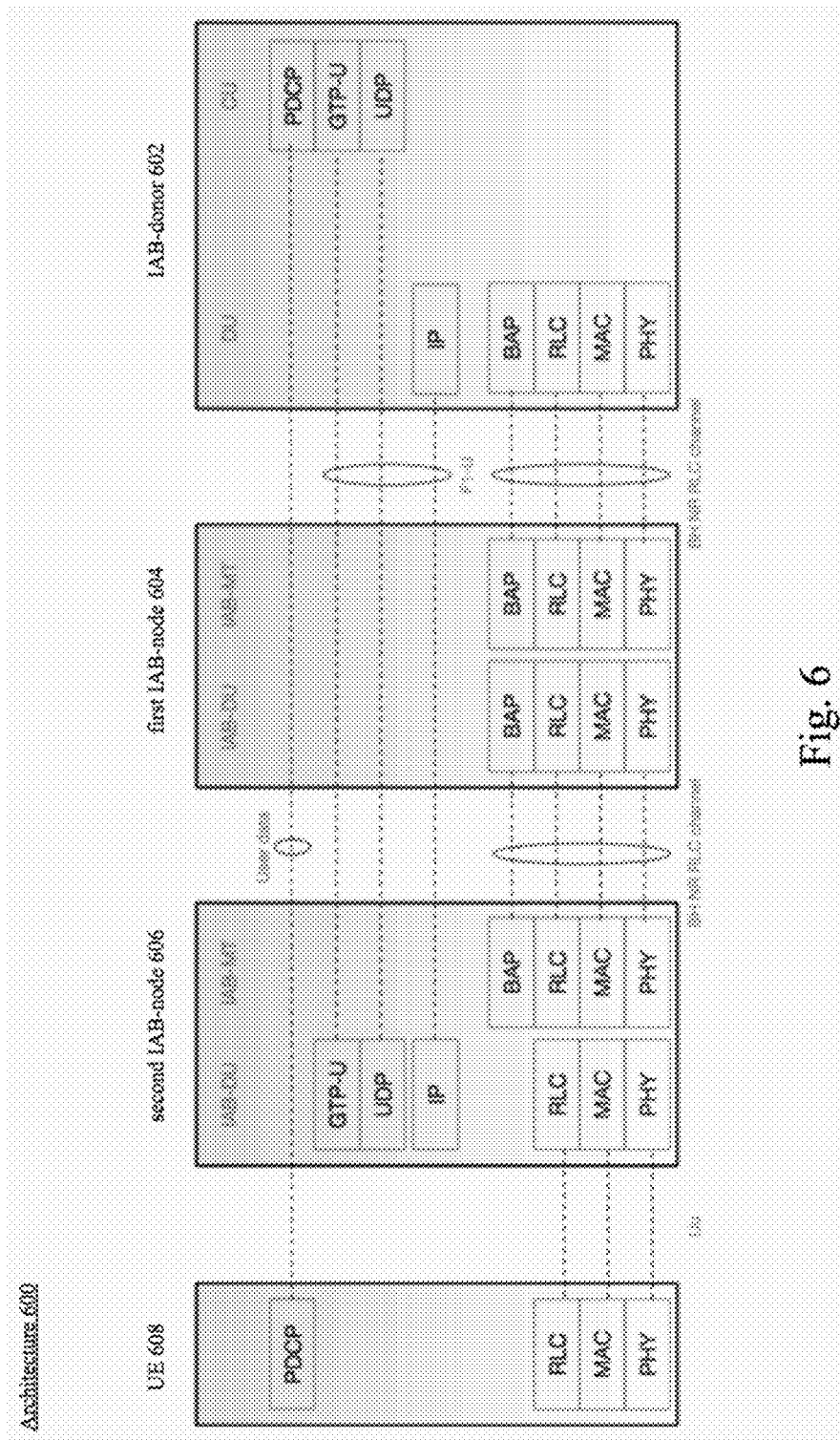
FIG. 6 shows the IAB user plane (UP) protocol architecture for an IAB arrangement according to various exemplary embodiments.

FIG. 6 shows the IAB user plane (UP) protocol architecture 600 for an IAB arrangement including an IAB-donor 602, a first IAB-node 604 and a second (child) IAB-node 606, similar to the systems discussed above with respect to FIGS. 5a-b. The IAB arrangement additionally includes an access UE 608 being served by the IAB-child.

As shown in FIG. 6, the packet data convergence protocol (PDCP) function is centralized at the IAB-donor 602 and the PDCP link terminates at the UE 608. However, each backhaul link, e.g., between the IAB-donor 602 and the first IAB-node 604, between the first IAB-node 604 and the second IAB-node 606, and between the second IAB-node 606 and the UE 608, terminates at the RLC layer. A Backhaul Adaptation Protocol (BAP) layer is introduced between the first and second IAB-nodes and between the first IAB-node and the IAB-donor. The BAP layer is configured for managing the routing of data for multiple UEs and bearers in the network.

Given that the data transmitted downstream to a UE accessing an IAB-node traverses multiple RLC links, it can experience increased delays. The delays in the data path can have a significant impact on the UE complexity and performance.

The L2 buffer is used at the UE for reordering data received out-of-order. It is dimensioned based on the RLC round trip time (RTT) for the NR data path. The RLC RTT is assumed to be 20, 30, 40 or 50 ms (depending on the sub-carrier spacing) for the NR data path. The required L2 buffer size is essentially a product of the data rate and the RLC RTT. IAB is intended to be able to support very high peak data rates (in particular, the backhaul links are expected to use FR2 and operate at a high SINR due to lack of mobility).

As specified in 3GPP TS 38.306, the required L2 buffer size at the UE for NR standalone operation without Dual Connectivity (DC) is computed as: MaxDLDataRate×RLC RTT+MaxULDataRate×RLC RTT. The RLC RTT is assumed to be 50, 40, 30 or 20 ms for sub-carrier spacings 15, 30, 60 and 120 kHz respectively.

In an IAB setting, the effective RTT (as seen at the PDCP layer at the UE) can be significantly higher. Generally, based on the number of IAB nodes in the IAB arrangement, the RTT can be a multiple of the RLC RTT assumed in TS 38.306. A UE designed based on the standard RLC RTT values can experience buffer overflows in an IAB network. This may result in packets being dropped by the UE even when radio conditions are good, resulting in a reduction in data rate, lower spectral efficiency and overall a broad compromise of the goals of IAB.

If the UE supports NSA IAB operation, e.g., dual connectivity (EN-DC or NR-DC) as shown in FIG. 5b, the required L2 buffer size depends on maximum data rates expected via the master node (MN) and the secondary node (SN), and the RLC RTT depends on inter-nodeB (X2/Xn) delays in addition to the SCS specific RTT values. The general approach to dimensioning the L2 buffer is based on the worst case scenario of the maximum data rate and the highest RLC RTT. However, this can be inadequate in various situations.

Consider, for example, a UE designed to operate only in FR1. Such a UE could connect to an IAB node, which is supported by backhaul links that use FR2. The L2 buffer is dimensioned based on 40 ms RTT (assuming 30 kHz SCS), however each backhaul link based on FR2 nominally adds 20 ms RTT. Furthermore, a UE designed to operate only in FR1 with NR standalone could connect to an IAB node that operates in NSA mode, such as that shown in FIG. 5b. This implies a significantly longer RTT to the IAB node due to the X2/Xn delays, which the UE is not aware of or designed for (specifically, in this example, the NSA arrangement results in a further RTT increase of 55 ms).

In another example, consider a UE designed to operate in NR-DC mode with split bearers. In this case, the buffer sizing depends on the larger of the data rate delay product of the MN data rate and SN RLC RTT plus the X2/Xn delay and the data rate delay product of the SN data rate and MN RLC RTT plus the X2/Xn delay. Suppose the latter is larger. If the MN node is additionally composed of an IAB path, the actual RTT and correspondingly the required L2 buffer can be significantly larger.

HARQ Operation in an IAB Network

Each backhaul link in an IAB network is subject to HARQ operation including all the available HARQ processes. HARQ operation implies that packets that arrive at the transmitting side in a particular sequence may not be received at the receiving side in the same sequence. A packet arriving to the transmitting side first, mapped to a first TB, may be successfully received after two or three HARQ transmissions, but a packet arriving second, mapped to a second TB, may be successfully received after a single HARQ transmission. Such variation of received packet order can also occur on the traditional Uu link, however, in an IAB network, such reordering can occur at every backhaul link.

For example, in a simplistic analysis, it can be assumed that the probability of successfully receiving a TB after one, two, three or four HARQ transmissions is 0.9, 0.99, 0.999 and 0.9999 respectively. Suppose packets with sequence numbers SN #1 and SN #2 are mapped to TB1 and TB2, with TB1 transmitted before TB2. In order for SN*2 to be received before SN #1, the number of HARQ transmissions for successful reception of TB1 and TB2 respectively can be any of the following pairs: {(2, 1),(3, 1),(3, 2),(4, 1),(4, 2),(4, 3)}. Thus, the probability of out of order reception on a single link can be computed as the sum of the probabilities of each, resulting in an out of order reception probability of 0.09.

If the data path has multiple links, each link can experience out of order packet reception due to HARQ, with the same probability (0.09) as shown above. The probability of reordering after passing through all the links can be computed based on the number of links. For example, with three total RLC links, e.g., the access link and two backhaul links as shown in FIG. 6, the packets would be received out of order if either one of the links reorders the packets and the other two do not, or all three links reorder the packets. The probabilities estimated in this manner are shown in Table 1 below.

TABLE 1

| Number of Links | Probability of out of order reception |
|---|---|
| 1 | 0.09 |
| 2 | 0.17 |
| 3 | 0.23 |
| 4 | 0.27 |

Out of order reception of packets can also occur in an IAB network due to the network topology. IAB nodes can use dual connectivity (DC) to connect to parent nodes, resulting in multiple data paths between a gNB and a UE. If data is transmitted to the UE over multiple paths, out of order reception of packets can occur due to different characteristics (resource allocation, data rates, number of links) on the different paths. Thus, larger proportions of the data are expected to be received out of order as the number of links in the data path increase.

This has the following two effects. First, the L2 reordering buffer of the UE is more heavily used and a larger number of packets have to be buffered. This can lead to drop of packets, which would result in retransmissions. Second, the reordering process is experienced as increased latency since packets have to be held back until reordering is performed.

The exemplary embodiments described herein relate to operations to mitigate the issues described above.

L2 Buffer Based Restriction of IAB Network Topology

According to some exemplary embodiments, a UE is configured to report various types of information to the network so that the network can reduce a throughput, e.g., a maximum data rate for the UE when certain IAB arrangements are configured for the UE. The UE can report this information via, e.g., UE capability signaling, and the network can configure/adjust a maximum data rate for the UE when particular IAB network topologies are configured.

It is currently specified for the UE to indicate to the network the bands, carriers, band combinations, etc. supported by the UE in UE capability signaling. The network can thus compute the maximum data rate and the required L2 buffer size. However, the network may not account for the additional data path delays discussed above when scheduling the UE, as discussed above.

Given a certain L2 buffer size for a UE, in order to ensure that packets are not dropped as the data path delays increase, the maximum data rate may be reduced.

According to a first option, the UE can report, as a part of its capability signaling, a reduction of its maximum data rate to support different IAB scenarios, for example the scenarios shown in the table 700 of FIG. 7. For example, depending on the baseline capabilities of the UE, the reduction of data rate may depend on 1) whether the IAB-nodes providing backhaul links to the UE are in SA or NSA e.g., EN-DC, 2) the frequency band used for the backhaul links (FR1, FR2, or FR1+FR2), 3) the frequency band for the access link, and 4) the number of backhaul links. The reduction may be reported as, e.g., a percentage value, relative to the maximum data rate computed by the network according to TS 38.306

The degree of reduction of the maximum data rate, or whether a reduction of the maximum data rate is needed at all, depends on the UE baseline capabilities. For example, a UE that is designed for operation in FR1 and FR2, and with EN-DC and NR-DC, may have a relatively large L2 buffer and not need a reduction for operation in a standalone IAB network with one or two backhaul links. Only a small reduction may be needed for operation in an EN-DC IAB network where the NR path has one or two backhaul links.

In another example, a UE that is designed for operation in FR1 only may need only a moderate data rate reduction for operation in a standalone IAB network with one or two backhaul links. This exemplary UE may need a larger reduction for operation in a standalone IAB network with three or more backhaul links, and may be unable to operate in an EN-DC IAB network.

The specific reduction values may depend on implementation details and can be determined via simulation. Thus, there is some flexibility in indicating a required reduction.

In a second option, a scheme may be used wherein the data rate is reduced by a single predetermined amount when the UE is in certain IAB arrangements. For example, the UE can report a maximum data rate reduction for access scenarios such as a standalone IAB network with three backhaul links, or an EN-DC IAB network with three backhaul links in the NR path. The maximum data rate may be reduced when any of the indicated IAB network configurations are deployed for the UE. Thus, for any of the specified IAB arrangements, a same data rate reduction is reported. Any combination of the above two options may be used.

In a third option, the UE can report a reduction of data rate per additional backhaul link. For example, a single reduction value may be signaled, and this value multiple times for as many backhaul links are used in the network topology. Based on the knowledge of the topology (specifically, the number of backhaul hops to the access IAB-node of the UE), the network can determine the actual reduction.

In a fourth option, the UE can report the maximum number of backhaul links that it can support (i.e., depth) given its L2 buffer. If the UE is currently deployed in an IAB network comprising a number of backhaul links that exceeds the reported maximum number, then the network may reconfigure the UE deployment, e.g., handover the UE to a node where the number of backhaul links is not exceeded and not allow the UE to access further IAB-nodes if the further IAB-nodes have a given number of upstream backhaul links. In another example, the network may reduce the data rate for the UE. In principle, the reduction would be computed such that the data rate and RTT product (with the longer RTT due to the BH links) is no more than the original maximum data rate and the RTT according to the maximum BH links indicated by the UE.

Figure 8:
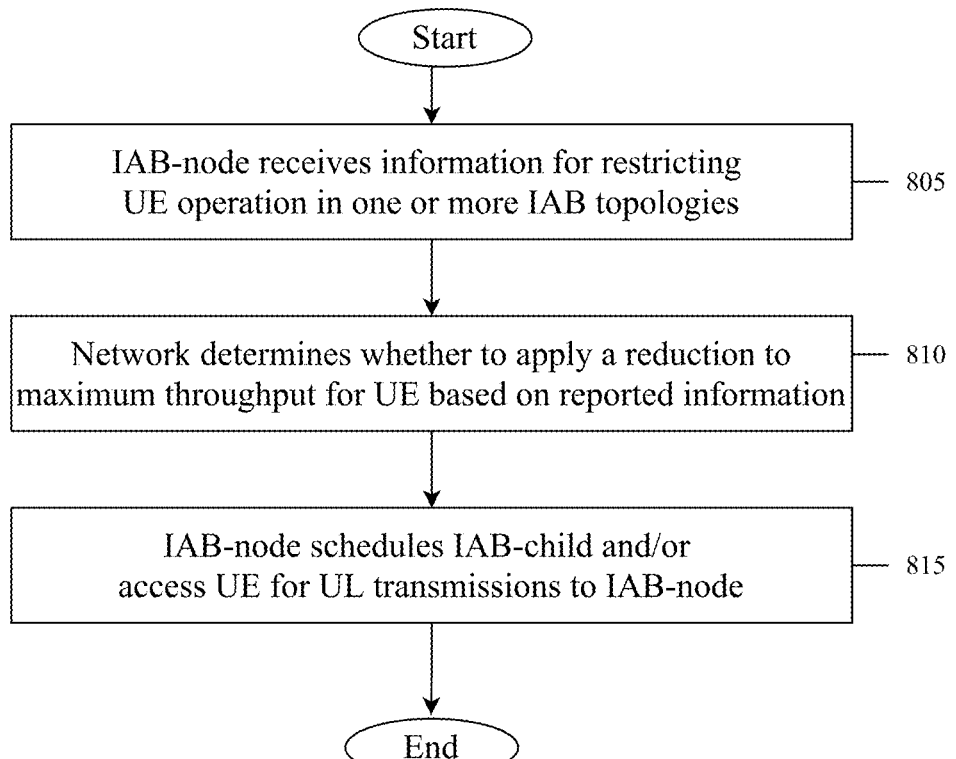
FIG. 8 shows a method for configuring an L2 buffer-based restriction for a UE deployed in an IAB network topology. according to various exemplary embodiments.

FIG. 8 shows a method 800 for configuring an L2 buffer-based restriction for a user equipment (UE) deployed in an integrated access and backhaul (IAB) network topology. The method 800 is described with respect to the first three options discussed above for reducing a maximum throughput for the UE.

In 805, the access IAB-node receives, from the UE, information for restricting UE operation in one or more IAB topologies. For example, in the first option discussed above, the UE reports a maximum data rate reduction for each of a plurality of IAB topologies in which the UE may be deployed, such as those shown in the table 700 of FIG. 7. In the second option, the UE reports a single data rate reduction for one or more IAB topologies in which the UE may be deployed. In the third option, the UE reports a single data rate reduction value that may be applied to each of the backhaul links of the IAB topology in which the UE is deployed.

In 810, the network determines whether to apply a reduction to the maximum throughput for the UE based on the reported information. That is, the network may determine whether the current IAB topology in which the UE is deployed was indicated by the UE as an IAB topology that requires a maximum throughput reduction.

In 815, when the current IAB topology in which the UE is deployed was indicated as an IAB topology that requires a throughput reduction, the network applies the indicated reduction value.

An effect of the above-described method is to reduce the amount of reordering that needs to be performed at the UE, when the data packets are ultimately received at the UE. When the throughput is reduced, the UE may have sufficient time to reorder the received packets before the L2 buffer of the UE becomes overloaded.

Minimizing Out of Order Packets at IAB Node

As discussed above with respect to FIG. 4, an IAB node has an MT part that maintains a radio link to a parent IAB node or IAB donor, and a DU part that maintains a radio link to a child IAB node or a UE. The RLC operation at the MT and the DU parts is assumed to follow the standard NR RLC procedures. This implies that data that is received is delivered to the BAP layer in the order that it is received. The BAP layer then performs routing and bearer mapping and submits the data to the appropriate RLC leg for transmission by the DU part on the next hop. The result is that the data is transmitted by the IAB node in the same order in which it is received.

Figure 9A:
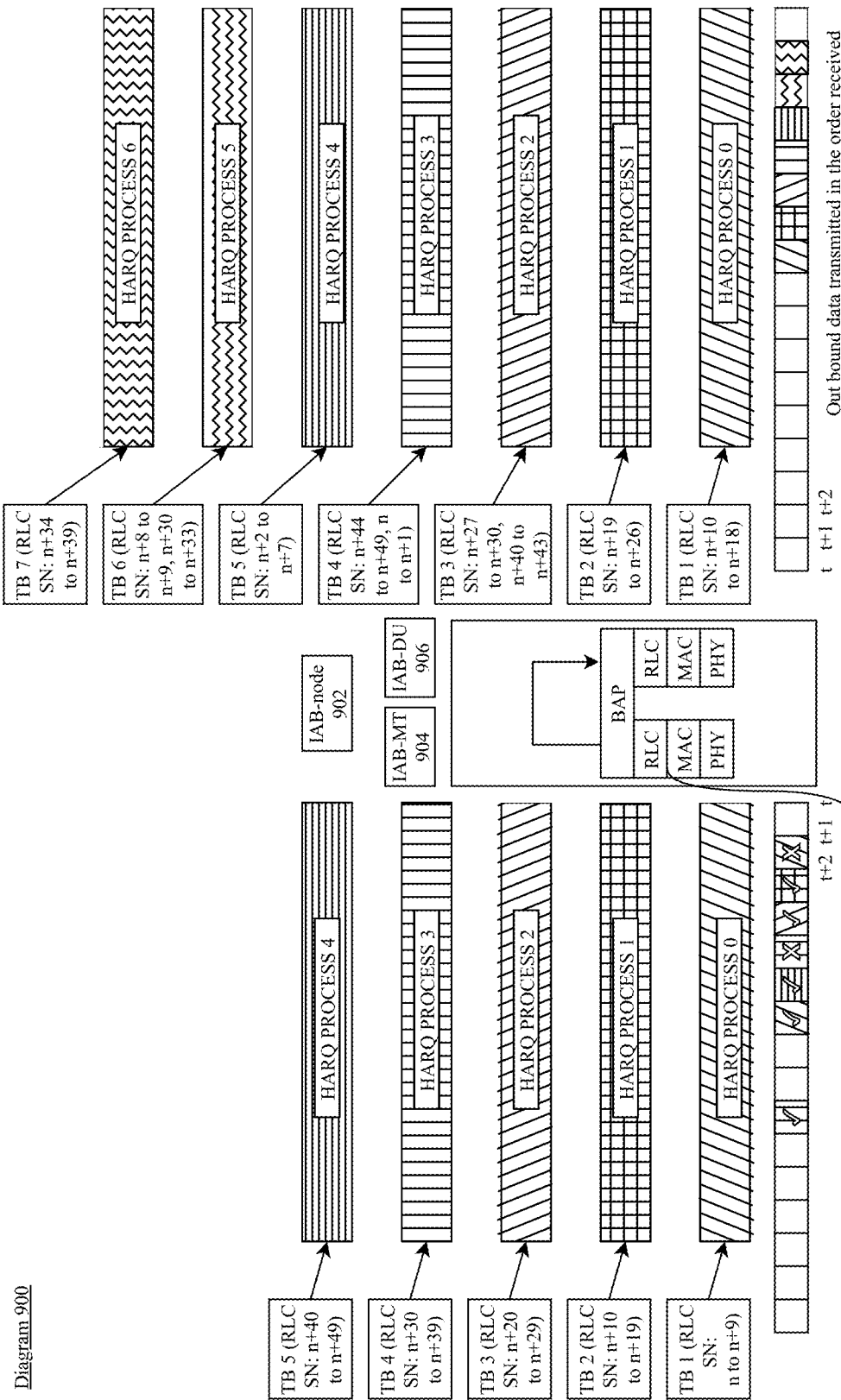
FIG. 9a shows a diagram for data packet transmissions being relayed at an IAB-node in an IAB arrangement according to existing methods.

FIG. 9a shows a diagram 900 for data packet transmissions being relayed at an IAB-node 902 in an IAB arrangement according to existing methods. The IAB-node 902 includes an IAB-MT 904 for maintaining upstream links and an IAB-DU 906 for maintaining downstream links. In this example, the direction of the data flow is downstream. Thus, the exemplary data packets are received at the MT 904 and re-transmitted from the DU 906.

The diagram 900 shows five transport blocks comprising RLC PDUs, each associated with a sequence number (SN), e.g., TB1 (including RLC SNs n to n+9), TB2 (including RLC SNs n+10 to n+19), TB3 (including RLC SNs n+20 to n+29), TB4 (including RLC SNs n+30 to n+39) and TB5 (including RLC SNs n+40 to n+49). Each TB is mapped to its own HARQ process, e.g., TB1 is mapped to HARQ process 0, TB2 is mapped to HARQ process 1, TB3 is mapped to HARQ process 2, TB4 is mapped to HARQ process 3, and TB5 is mapped to HARQ process 4. In this example, the first transmission attempt for TB1 and TB4, associated with HARQ processes 0 and 3, fail on a first attempt and are retransmitted in later slots, after the successful transmission of TB2, TB3 and TB5, associated with HARQ processes 1-2 and 4, respectively. Thus, the order in which the TBs are received at the IAB-MT 904 is 1, 2, 4, 0, 3. Thus, the received order of RLC PDUs is n+10 to n+19, n+20 to n+29, n+40 to n+49, n to n+9, n+30 to n+39. According to existing methods, the BAP layer routes the packets to the IAB-DU 906 as the packets are received, for transmission to the next node in the linkage. The IAB-DU 906 then proceeds to map the RLC PDUs to TBs in the order in which they were received at the DU 906.

Specifically, the IAB DU does not have information about the order in which the data originated (i.e., the order in which it was first transmitted to the IAB MT).

According to a second exemplary embodiment, the IAB-node performs operations for reordering received data packets into the order in which they were transmitted.

In a first option, to be described in detail below, the IAB-MT provides to the IAB-DU some information to help the IAB-DU ensure appropriate ordering of the data. In a second option, to be described in detail below, the IAB-MT performs reordering of the received data before delivering to the IAB-DU.

In this exemplary scenario, the data transmissions are sent in the downstream direction, e.g., from an IAB-parent, and are being relayed to a further IAB-node (IAB-child) or an access UE. However, the exemplary embodiments described below may be applied in a similar manner for data transmissions sent in the upstream direction, e.g., from an access UE or an IAB-child to an IAB-node for relay to an IAB-parent. In such a scenario, the data transmissions received at the IAB-node will be received at the IAB-DU and routed to the IAB-MT for transmission to the IAB-parent.

Given differences in availability of resources for transmissions on different links (including, the need to support a number of child nodes/UEs), it is generally possible to perform some reordering of the data at the IAB node without additional buffering delays. Bundling, where a receiver collects packets over a period of time and delivers them at predefined intervals for further processing or transmission, is used commonly. Specifically, if two units of data are received at an IAB node, the data whose transmission was initiated first should be transmitted first by the IAB node.

According to the first option, the receiving entity (the IAB-MT in the above example) can associate a "sequencing-stamp" to the RLC PDUs based on the first HARQ transmission of the TB that includes the SDU.

Figure 9B:
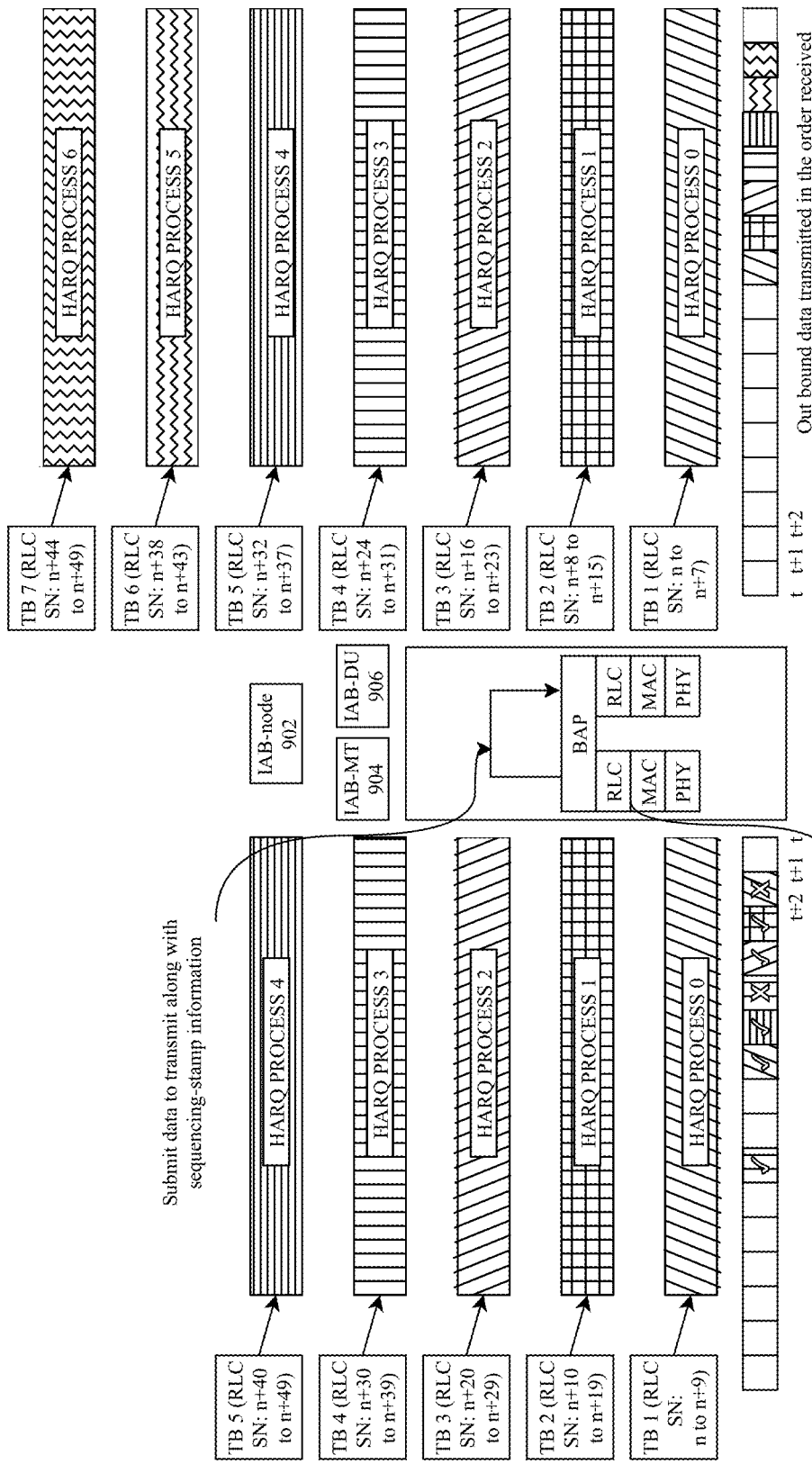
FIG. 9b shows a diagram for data packet transmissions being relayed at an IAB-node in an IAB arrangement with a sequencing stamp associating the packets with an order in which the packets were transmitted according to various exemplary embodiments.

FIG. 9b shows a diagram 950 for data packet transmissions being relayed at an IAB-node 902 in an IAB arrangement with a sequencing stamp associating the packets with an order in which the packets were transmitted. The diagram 950 illustrates the effect of the sequencing-stamp based reordering described above.

For example, with reference to the transmission diagram 950, RLC PDUs with RLC SN n to n+9 are mapped to TB1 and associated with sequencing-stamp t+1, corresponding to the slot in which the PDUs were first transmitted, although those PDUs are not received until time slot t+6. RLC SNs n+10 to n+19 mapped to TB2 and are associated with sequencing-stamp t+2, RLC SNs n+20 to n+29 are mapped to TB3 and associated with sequencing-stamp t+3 and RLC SNs n+40 to n+49 are mapped to TB5 and associated with sequencing-stamp t+5. Each of these transmissions (TB2, TB3 and TB5) are received on a first attempt. RLC SNs n+30 to n+39 are mapped to TB4 and associated with sequencing-stamp t+4, corresponding to the slot in which the PDUs were first transmitted, although those PDUs are not received until t+9.

Thus, the received order of RLC PDUs is n+10 to n+19, n+20 to n+29, n+40 to n+49, n to n+9, n+30 to n+39. The received RLC PDUs, along with the sequencing-stamp information, are submitted from the IAB-MT 904 to the IAB-DU 906 via the BAP protocol. The IAB-DU 906 then uses the sequencing-stamp information to order the data for transmission. Thus, the IAB-DU 906 transmits data from received RLC PDUs in the following order: n, . . . , n+9, . . . , n+19, . . . , n+29, . . . , n+39, . . . , n+49.

It is noted that the reordering is performed on the DU side, and that the IAB-DU may not necessarily wait to receive all missing packets before transmitting the packets already available for transmission. That is, the data is sorted in the RLC buffer of the DU based on the sequencing-stamp value, but no operations are performed by the DU to ensure that there are no packets missing, e.g., packets which have failed to be received yet at the MT side. Thus, only the packets available at the DU are sorted. Depending on the resource availability at the IAB-DU, it may not always be possible to perform reordering of all out-of-order packets without introducing additional delays. However, performing such reordering whenever it is possible can still be beneficial.

It is further noted that the same technique can be used for upstream traffic as well, wherein the receiving entity of the IAB node is the IAB-DU and the transmitting entity is the IAB-MT. This can reduce occurrence of out-of-order packet reception at the gNB and consequently reduce "acknowledgment storms," where a large number of TCP ACKs are received on the downlink, due to release of large number of packets from the gNB upstream after reordering.

According to another exemplary embodiment, QoS handling and reordering is considered for the method discussed above.

A backhaul link carries traffic of multiple UEs/multiple bearers. In particular, multiple UE bearers with similar QoS characteristics can be mapped to a single logical channel on a backhaul link. This is referred to as N:1 bearer mapping. Reordering at the IAB-MT as described above, based only on which TB was first transmitted, may result in the IAB-DU not correctly prioritizing the out-bound traffic according to the QoS requirements. In order to ensure such prioritization is still possible with reordering, the IAB DU can perform reordering with a QoS stream granularity.

For QoS handling purposes, the IAB DU may be configured with a mapping of inbound logical channels to outbound logical channels and prioritization rules for outbound logical channels. The number of levels used for prioritization of outbound logical channels corresponds to the number of QoS streams handled. The IAB DU can perform reordering within each QoS stream. This would ensure that the IAB DU can still perform logical channel prioritization while still minimizing out-of-order packets.

Figure 10:
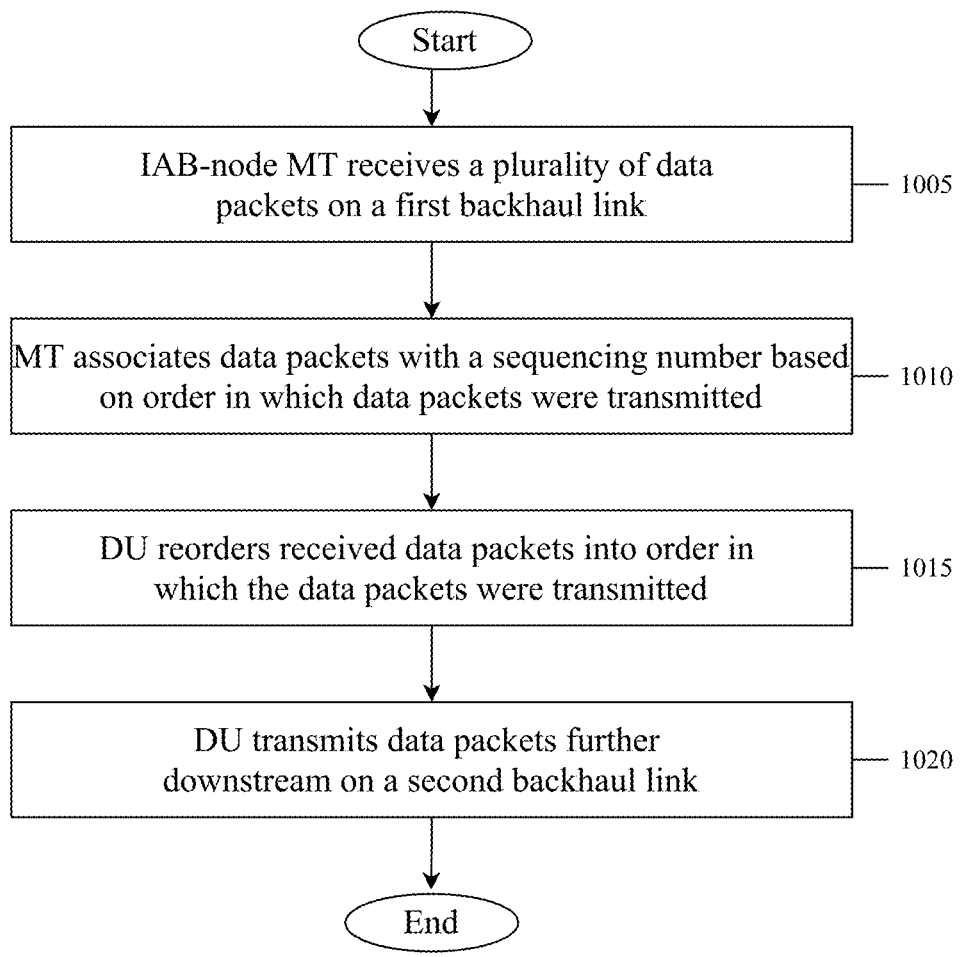
FIG. 10 shows a method for reordering data packets received at an IAB-node according to various exemplary embodiments.

FIG. 10 shows a method 1000 for reordering data packets received at an IAB-node. In 1005, the IAB-node MT receives a plurality of data packets on a first backhaul link. The data packets may be received out of order relative to the order in which they were transmitted.

In 1010, the MT associates the data packets with a sequencing number based on the order in which the data packets were transmitted. In 1015, the MT submits the data packets and corresponding sequencing numbers to the IAB-node DU via the BAP protocol.

In 1015, the DU reorders the received data packets into the order in which the data packets were transmitted. The DU performs the reordering based on the sequencing number provided by the MT. In some embodiments, the UE performs reordering within each QoS stream for the data packets.

In 1020, the DU transmits the data packets further downstream on a second backhaul link.

An effect of the above-described method is to reduce the amount of reordering that needs to be performed at the UE, when the data packets are ultimately received at the UE. Thus, the increased number of out of order packets inherent in an IAB topology may be reduced, and the L2 buffer of the UE is less likely to become overloaded.

Buffering and Reordering at IAB MT

According to a third exemplary embodiment, The IAB MT can have a reordering buffer at the RLC layer and perform reordering of RLC PDUs. Since the reordering puts the PDUs in the order of RLC sequence numbers, this is equivalent to ordering based on the transmission order.

It is noted that the RLC layer in 3GPP NR does not perform reordering (however, the RLC layer in LTE does). Thus, a change would need to be made at the NR protocol stack (for IAB MT operation). The RLC layer of the IAB MT then delivers the packets in order to the BAP layer. In order to ensure that the wait for packets received out-of-order is time-bounded (i.e., upon expiry of a timer, the buffered packets are delivered to the BAP layer). One consequence of this traditional re-ordering approach is that this would mean additional delay in the data path. In order to mitigate such delays, the IAB Node can maintain a single buffer for the RLC and BAP layers. The IAB MT is configured to rearrange received packets to be in order within the shared buffer. The BAP layer operations are performed in-place. The IAB DU takes packets for transmission from the shared buffer. Note that although this approach can add some delays, it results in more robust reordering (i.e., it is not based on just which RLC SDUs were placed in TBs first; rather it is based on which RLC SDUs were constructed first).

Other options may be used for performing reordering at the IAB MT. Instead of using the RLC sequence numbers for reordering at the IAB MT, the sequence stamp based approach can be used as well. This can provide a simpler reordering mechanism (compared to the full scale reordering based on RLC sequence numbers). If the BAP layer has a sequence number, the BAP layer sequence number could be used for reordering in the same manner as the RLC sequence number. One advantage of reordering based on BAP layer sequence numbers is that the reordering and QoS/logical channel prioritization can be separated. That is, the BAP layer can perform reordering to match the order in which BAP packets were generated by the transmitter; the RLC layer can then submit data for transmission taking into account QoS criteria.

Buffering and Reordering at Access IAB Node

Instead of handling reordering at the PDCP layer alone (which can have the issues described above), the access IAB node can perform reordering prior to transmitting the data packets downstream. This would need to be done at the IAB-DU side (for downstream transmissions) after the BAP layer submits data to the DU RLC for transmission. Specifically, an access IAB node would need one reordering buffer for each UE being served by the access IAB node. In order to place the data in the order of the original transmission, the access IAB Node needs a sequence number that indicates the order. Three options and corresponding methods are described below.

In a first option, the GTP-U header is used for applying a sequence number to the data packets. The access IAB Node can use a buffer to reorder GTP-U packets based on the sequence number in the GTP-U header. The GPRS Tunnelling Protocol specified in 3GPP TS 29.281 allows for an optional sequence number in the header. Each UE DRB corresponds to a GTP-U tunnel between the UE's access IAB Node and the CU (see TS 38.425). The access IAB DU submits packets to the lower layers after reordering. This results in delivery of packets to the UE with the effects of reordering due to the backhaul links removed.

Figure 11:
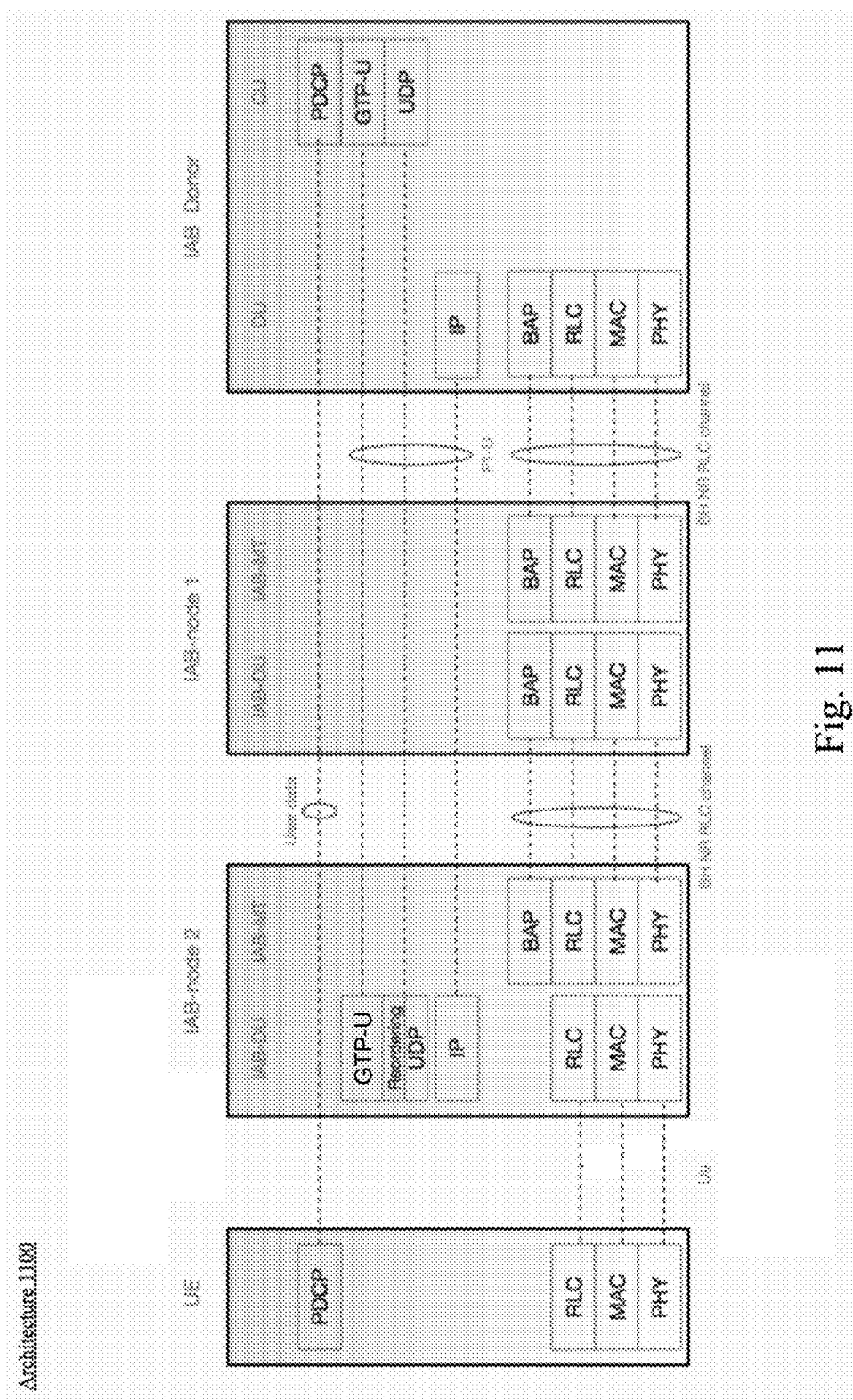
FIG. 11 shows an IAB user plane (UP) protocol architecture for an IAB arrangement including a reordering buffer according to various exemplary embodiments.

FIG. 11 shows an IAB user plane (UP) protocol architecture 1100 for an IAB arrangement including a reordering buffer. The architecture 1100 is similar to the architecture 600 described above with respect to FIG. 6. However, as shown at the access IAB-node (IAB-node 2), a reordering buffer is added below the GTP-U, as described above.

The NR user plane protocol (see TS 38.425) can be configured for in-sequence delivery of packets between the CU and the (IAB-)DU. The access IAB node can make use of sequence numbering in GTP-U for reordering purposes. A reordering timer is needed to ensure that the wait for out-of-order packets is not unbounded. Naturally, such a timer can introduce additional delays in the data path. Therefore, it is necessary to perform such reordering at the access IAB Node only when requested by the UE (i.e., when the experiencing very high L2 buffer usage leading to packet drops).

The following scheme is envisioned to turn on/off the reordering at the access IAB Node.

First, when the UE detects large proportions of out-of-order packets resulting in heavy buffer usage, it transmits an indication to the access IAB Node DU (using a MAC CE or an RLC control PDU) indicating a need to perform reordering at the IAB Node DU. Next, the IAB Node DU initiates the reordering procedure described above. When the buffer usage eases (e.g., due to drop in data rate), the UE indicates to the network (via a MAC CE or RLC control PDU) that the reordering can be stopped.

In a second option, GTP-U packets can be time-stamped (i.e., a time-stamp is added to the GTP-U header). The time stamp can be used to perform reordering at the access IAB Node. The buffering approach described above can be used.

The time-stamps enable the IAB Node to track a maximum one-way trip time from the CU to the IAB Node. This can enable the IAB Node to set the reordering timer duration such that (a) the average PDCP to PDCP latency (between the CU and the UE) is not increased, and (b) the probability of any residual out-of-order packets after reordering is negligible.

Figure 12:
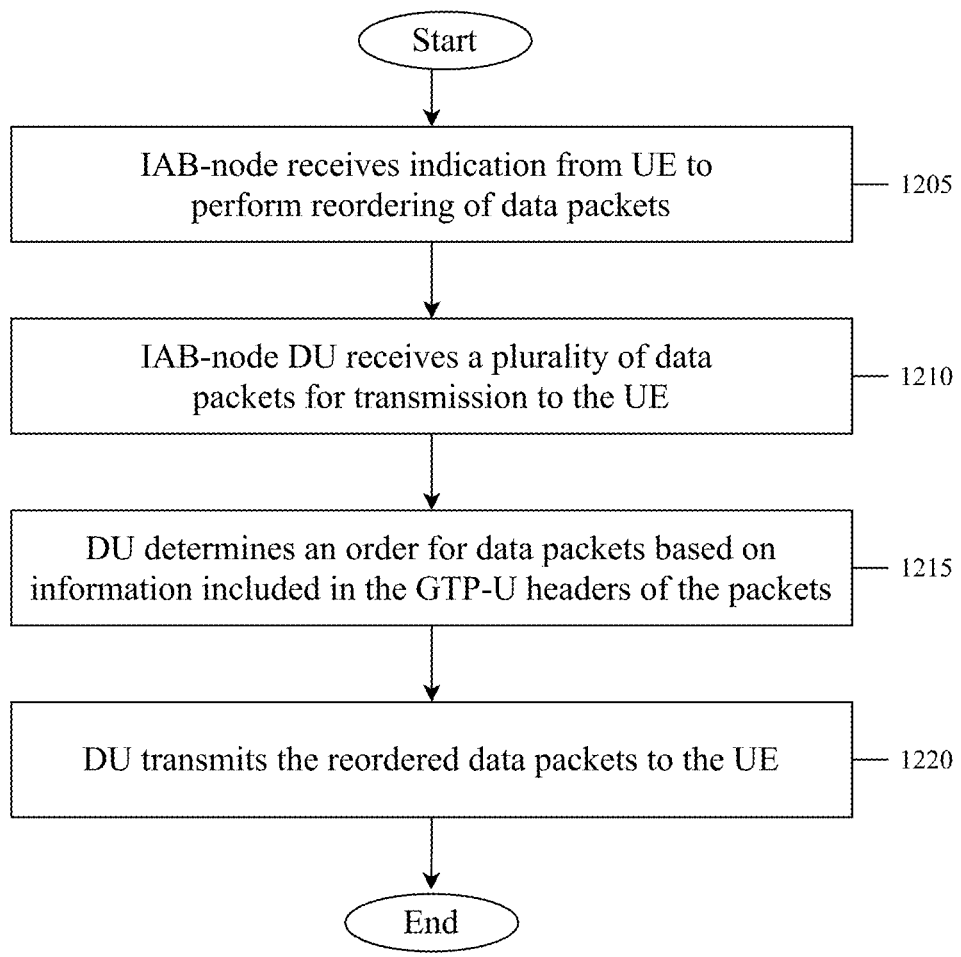
FIG. 12 shows a method for reordering data packets received at an access IAB-node prior to transmission to a user equipment (UE) according to various exemplary embodiments.

FIG. 12 shows a method 1200 for reordering data packets received at an access IAB-node prior to transmission to a user equipment (UE). In 1205, the IAB-node receives an indication from the UE to perform reordering of data packets.

In 1210, the IAB-node DU receives a plurality of data packets for transmission to the UE. The data packets may be received out of order relative to the order in which they were transmitted.

In 1215, the DU determines an order (reorders) for the data packets based on information included in the GTP-U headers of the packets. In 1220, the DU transmits the reordered data packets to the UE.

Examples

In a first example, a processor of a user equipment (UE) is configured to perform operations comprising accessing a first base station in a communications network via an access link, wherein the first base station is an integrated access and backhaul (IAB) node in a first IAB network topology comprising at least one backhaul link to a second base station, wherein the second base station is an IAB-donor for the first base station, reporting, to the first base station, information for a number of backhaul links supported by the UE when deployed in an IAB network topology and receiving a command for a handover from the first base station to a further base station when the number of backhaul links in the first IAB network topology exceeds the number in the reported information.

In a second example, a user equipment (UE), comprises a transceiver configured to communicate with a network and a processor communicatively coupled to the transceiver and configured to perform operations comprising accessing a first base station in a communications network via an access link, wherein the first base station is an integrated access and backhaul (IAB) node in a first IAB network topology comprising at least one backhaul link to a second base station, wherein the second base station is an IAB-donor for the first base station, reporting, to the first base station, information for a number of backhaul links supported by the UE when deployed in an IAB network topology and receiving a command for a handover from the first base station to a further base station when the network determines that the number of backhaul links in the first IAB network topology exceeds the number in the reported information.

In a third example, a processor of a user equipment (UE) is configured to perform operations comprising accessing a first base station in a communications network via an access link, wherein the first base station is an integrated access and backhaul (IAB) node in a first IAB network topology comprising at least one backhaul link to a second base station, wherein the second base station is an IAB-donor for the first base station, reporting, to the first base station, information for a number of backhaul links supported by the UE when deployed in an IAB network topology and receiving data packages with a reduced maximum data rate when the number of backhaul links in the first IAB network topology exceeds the number in the reported information.

In a fourth example, a user equipment (UE), comprises a transceiver configured to communicate with a network and a processor communicatively coupled to the transceiver and configured to perform operations comprising accessing a first base station in a communications network via an access link, wherein the first base station is an integrated access and backhaul (IAB) node in a first IAB network topology comprising at least one backhaul link to a second base station, wherein the second base station is an IAB-donor for the first base station, reporting, to the first base station, information for a number of backhaul links supported by the UE when deployed in an IAB network topology and receiving data packages with a reduced maximum data rate when the network determines that the number of backhaul links in the first IAB network topology exceeds the number in the reported information.

In a fifth example, a first base station, comprises a transceiver configured to communicate with a user equipment (UE) and a processor communicatively coupled to the transceiver and configured to perform operations comprising communicating with the UE via an access link, wherein the first base station is an integrated access and backhaul (IAB) node in a first IAB network topology connected to a second base station via one or more backhaul links, wherein the second base station is an IAB-donor for the first base station, receiving, from the UE, reported information for reducing a maximum data rate for the UE when the UE is deployed in one or more IAB network topologies and transmitting data packages to the UE with a reduced maximum data rate when, based on the reported information, the first IAB network topology is an IAB network topology included in the reported information.

In a sixth example, the first base station of the fifth example, wherein the reported information indicates a reduction value for the maximum data rate based on whether the first IAB network topology is a standalone IAB network topology or a non-standalone IAB network topology, wherein the standalone IAB network topology comprises 5G backhaul links and the non-standalone IAB network topology comprises 5G and LTE backhaul links.

In a seventh example, the first base station of the fifth example, wherein the reported information indicates a reduction value for the maximum data rate based on whether the backhaul links operate in FR1, FR2, or a combination of FR1 and FR2.

In an eighth example, the first base station of the fifth example, wherein the reported information indicates a reduction value for the maximum data rate based on whether the access link operates in FR1, FR2, or a combination of FR1 and FR2.

In a ninth example, the first base station of the fifth example, wherein the reported information indicates a reduction value for the maximum data rate based on a total number of backhaul links in the first IAB network topology.

In a tenth example, the first base station of the fifth example, wherein the reported information indicates a reduction value as a single value to be applied when the first IAB network topology is any one of a list of IAB network topologies.

In an eleventh example, the first base station of the fifth example, wherein the reported information indicates a reduction value to be applied for each backhaul link in the first IAB network topology, wherein the reduction value is based on at least a number of backhaul links in the first IAB network.

In a twelfth example, a processor of a first base station in a communications network is configured to perform operations comprising communicating with a user equipment (UE) via an access link, wherein the first base station is an integrated access and backhaul (IAB) node in a first IAB network topology connected to a second base station via one or more backhaul links, wherein the second base station is an IAB-donor for the first base station, receiving, from the UE, reported information for a number of backhaul links supported by the UE when deployed in an IAB network topology and initiating a handover from the first base station to a further base station when the number of backhaul links in the first IAB network topology exceeds the number in the reported information.

In a thirteenth example, a first base station, comprises a transceiver configured to communicate with a user equipment (UE) and a processor communicatively coupled to the transceiver and configured to perform operations comprising communicating with the UE via an access link, wherein the first base station is an integrated access and backhaul (IAB) node in a first IAB network topology connected to a second base station via one or more backhaul links, wherein the second base station is an IAB-donor for the first base station, receiving, from the UE, reported information for a number of backhaul links supported by the UE when deployed in an IAB network topology and initiating a handover from the first base station to a further base station when the number of backhaul links in the first IAB network topology exceeds the number in the reported information.

In a fourteenth example, a processor of a first base station in a communications network is configured to perform operations comprising communicating with a user equipment (UE) via an access link, wherein the first base station is an integrated access and backhaul (IAB) node in a first IAB network topology connected to a second base station via one or more backhaul links, wherein the second base station is an IAB-donor for the first base station, receiving, from the UE, reported information for a number of backhaul links supported by the UE when deployed in an IAB network topology and transmitting data packages to the UE with a reduced maximum data rate when the number of backhaul links in the first IAB network topology exceeds the number in the reported information.

In a fifteenth example, a first base station, comprises a transceiver configured to communicate with a user equipment (UE) and a processor communicatively coupled to the transceiver and configured to perform operations comprising communicating with the UE via an access link, wherein the first base station is an integrated access and backhaul (IAB)

node in a first IAB network topology connected to a second base station via one or more backhaul links, wherein the second base station is an IAB-donor for the first base station, receiving, from the UE, reported information for a number of backhaul links supported by the UE when deployed in an IAB network topology and transmitting data packages to the UE with a reduced maximum data rate when the number of backhaul links in the first IAB network topology exceeds the number in the reported information.

In a sixteenth example, a processor of a base station, wherein the base station is an integrated access and backhaul (IAB) node including a mobile termination (MT) and a distributed unit (DU) for integrated access and backhaul (IAB) operation, the processor is configured to perform operations comprising receiving, at the MT, data packets on a first backhaul link, associating, at the MT, the data packets with a sequencing number based on an order in which the data packets were transmitted, transmitting the data packets from the MT to the DU, reordering, at the DU, the data packets into the order in which the data packets were transmitted based on the sequencing number and transmitting, from the DU, the reordered data packets on a second backhaul link or an access link.

In a seventeenth example, the processor of the sixteenth example, wherein the DU is configured with a mapping of inbound logical channels to outbound logical channels and prioritization rules for outbound logical channels.

In an eighteenth example, the processor of the seventeenth example, wherein the operations further comprise reordering, at the DU, the data packets within the outbound logical channels.

In a nineteenth example, a base station, comprises a mobile termination (MT) unit, a distributed unit (DU), wherein the MT and DU units are for integrated access and backhaul (IAB) operation, a transceiver configured to communicate with a user equipment (UE) or a further network component and a processor communicatively coupled to the transceiver and configured to perform operations comprising receiving, at the MT, data packets on a first backhaul link, associating, at the MT, the data packets with a sequencing number based on an order in which the data packets were transmitted, transmitting the data packets from the MT to the DU, reordering, at the DU, the data packets into the order in which the data packets were transmitted based on the sequencing number and transmitting, from the DU, the reordered data packets on a second backhaul link or an access link.

In a twentieth example, the base station of the nineteenth example, wherein the DU is configured with a mapping of inbound logical channels to outbound logical channels and prioritization rules for outbound logical channels.

In a twenty first example, the base station of the twentieth example, wherein the operations further comprise reordering, at the DU, the data packets within the outbound logical channels.

In a twenty second example, a processor of a base station, wherein the base station is an integrated access and backhaul (IAB) node including a mobile termination (MT) and a distributed unit (DU) for integrated access and backhaul (IAB) operation, the processor is configured to perform operations comprising receiving, at the DU, a plurality of data packets on a first backhaul link or an access link, associating, at the DU, the data packets with a sequencing number based on an order in which the data packets were transmitted, transmitting the data packets from the DU to the MT, reordering, at the MT, the data packets into the order in which the data packets were transmitted based on the sequencing number and transmitting, from the MT, the plurality of data packets on a second backhaul link.

In a twenty third example, a base station, comprises a mobile termination (MT) unit, a distributed unit (DU), wherein the MT and DU units are for integrated access and backhaul (IAB) operation, a transceiver configured to communicate with a user equipment (UE) or a further network component and a processor communicatively coupled to the transceiver and configured to perform operations comprising receiving, at the DU, a plurality of data packets on a first backhaul link or an access link, associating, at the DU, the data packets with a sequencing number based on an order in which the data packets were transmitted, transmitting the data packets from the DU to the MT, reordering, at the MT, the data packets into the order in which the data packets were transmitted based on the sequencing number and transmitting, from the MT, the data packets on a second backhaul link.

In a twenty fourth example, a processor of a first base station is configured to perform operations comprising communicating with a user equipment (UE) via an access link, wherein the first base station is an integrated access and backhaul (IAB) node in a first IAB network topology comprising at least one backhaul link to a second base station, wherein the second base station is an IAB-donor for the first base station, receiving, from the UE, an indication to perform reordering of data packets at the first base station, reordering the data packets into an order in which the data packets were transmitted and transmitting the data packets on the access link.

In a twenty fifth example, the processor of the twenty fourth example, wherein the operations further comprise determining, based on general packet radio service (GPRS) tunnelling protocol for user plane (GTP-U) headers for the data packets, the order in which the data packets were transmitted.

In a twenty sixth example, the processor of the twenty fifth example, wherein the GTP-U headers include a sequence number corresponding to the order in which the data packets were transmitted.

In a twenty seventh example, the processor of the twenty fifth example, wherein the GTP-U headers include a timestamp corresponding to a time at which the data packets were transmitted.

In a twenty eighth example, the processor of the twenty fifth example, wherein the operations further comprise implementing a reordering timer so that, when the reordering timer expires before missing data packets are received, the first base station transmits available data packets prior to receiving the missing data packets.

In a twenty ninth example, a first base station, comprises a transceiver configured to communicate with a user equipment (UE) and a processor communicatively coupled to the transceiver and configured to perform operations comprising communicating with the UE via an access link, wherein the first base station is an integrated access and backhaul (IAB) node in a first IAB network topology comprising at least one backhaul link to a second base station, wherein the second base station is an IAB-donor for the first base station, receiving, from the UE, an indication to perform reordering of data packets at the first base station, reordering the data packets into an order in which the data packets were transmitted and transmitting the data packets on the access link.

In a thirtieth example, the first base station of the twenty ninth example, wherein the operations further comprise determining, based on general packet radio service (GPRS)

tunnelling protocol for user plane (GTP-U) headers for the data packets, the order in which the data packets were transmitted.

In a thirty first example, the first base station of the thirtieth example, wherein the GTP-U headers include a sequence number corresponding to the order in which the data packets were transmitted.

In a thirty second example, the first base station of the thirtieth example, wherein the GTP-U headers include a timestamp corresponding to a time at which the data packets were transmitted.

In a thirty third example, the first base station of the thirtieth example, wherein the operations further comprise implementing a reordering timer so that, if the reordering timer expires before missing data packets are received, the first base station transmits available data packets prior to receiving the missing data packets.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) configured to perform operations comprising:
    accessing a first base station in a network via an access link, wherein the first base station is an integrated access and backhaul (IAB) node in a first IAB network topology connected to a second base station via one or more backhaul links, wherein the second base station is an IAB-donor for the first base station;
    reporting, to the first base station, information to be used by the network for reducing a maximum data rate for the UE when the UE is deployed in one or more IAB network topologies, wherein the reported information indicates a reduction value for the maximum data rate based on whether the first IAB network topology is a standalone IAB network topology or a non-standalone IAB network topology, wherein the standalone IAB network topology comprises Fifth Generation (5G) backhaul links and the non-standalone IAB network topology comprises 5G and Long-Term Evolution (LTE) backhaul links; and
    receiving data packages with a reduced maximum data rate based on the reported information.

2. The processor of claim 1, wherein the reduction value for the maximum data rate is further based on whether the backhaul links operate in Frequency Range 1 (FR1), Frequency Range 2 (FR2), or a combination of FR1 and FR2.

3. The processor of claim 1, wherein the reduction value for the maximum data rate is further based on whether the access link operates in Frequency Range 1 (FR1), Frequency Range 2 (FR2), or a combination of FR1 and FR2.

4. The processor of claim 1, wherein the reduction value for the maximum data rate is further based on a total number of backhaul links in the first IAB network topology.

5. The processor of claim 1, wherein the reduction value is provided as a single value to be applied when the first IAB network topology is any one of a list of IAB network topologies.

6. The processor of claim 1, wherein the reduction value is to be applied for each backhaul link in the first IAB network topology.

7. A user equipment (UE), comprising:
    a transceiver configured to communicate with a network; and
    a processor communicatively coupled to the transceiver and configured to perform operations comprising:
        accessing a first base station in a network via an access link, wherein the first base station is an integrated access and backhaul (IAB) node in a first IAB network topology connected to a second base station via one or more backhaul links, wherein the second base station is an IAB-donor for the first base station;
        reporting, to the first base station, information to be used by the network for reducing a maximum data rate for the UE when the UE is deployed in one or more IAB network topologies, wherein the reported information indicates a reduction value for the maximum data rate based on whether the first IAB network topology is a standalone IAB network topology or a non-standalone IAB network topology, wherein the standalone IAB network topology comprises 5G backhaul links and the non-standalone IAB network topology comprises 5G and LTE backhaul links; and
        receiving data packages with a reduced maximum data rate based on the reported information.

8. The UE of claim 7, wherein the reduction value for the maximum data rate is further based on whether the backhaul links operate in Frequency Range 1 (FR1), Frequency Range 2 (FR2), or a combination of FR1 and FR2.

9. The UE of claim 7, wherein the reduction value for the maximum data rate is further based on whether the access link operates in Frequency Range 1 (FR1), Frequency Range 2 (FR2), or a combination of FR1 and FR2.

10. The UE of claim 7, wherein the reduction value for the maximum data rate is further based on a total number of the backhaul links in the first IAB network topology.

11. The UE of claim 7, wherein the reduction value is provided as a single value to be applied when the first IAB network topology is any one of a list of IAB network topologies.

12. The UE of claim 7, wherein the reduction value is to be applied for each backhaul link in the first IAB network topology.

13. A processor of a first base station in a network configured to perform operations comprising:
    communicating with a user equipment (UE) via an access link, wherein the first base station is an integrated access and backhaul (IAB) node in a first IAB network topology connected to a second base station via one or more backhaul links, wherein the second base station is an IAB-donor for the first base station;
    receiving, from the UE, reported information to be used by the network for reducing a maximum data rate for the UE when the UE is deployed in one or more IAB network topologies, wherein the reported information indicates a reduction value for the maximum data rate based on whether the first IAB network topology is a standalone IAB network topology or a non-standalone IAB network topology, wherein the standalone IAB network topology comprises 5G backhaul links and the non-standalone IAB network topology comprises 5G and LTE backhaul links; and
    transmitting data packages to the UE with a reduced maximum data rate when, based on the reported information.

14. The processor of claim 13, wherein the reduction value for the maximum data rate is further based on whether the backhaul links operate in Frequency Range 1 (FR1), Frequency Range 2 (FR2), or a combination of FR1 and FR2.

15. The processor of claim 13, wherein the reduction value for the maximum data rate is further based on whether the access link operates in Frequency Range 1 (FR1), Frequency Range 2 (FR2), or a combination of FR1 and FR2.

16. The processor of claim 13, wherein the reduction value for the maximum data rate is further based on a total number of backhaul links in the first IAB network topology.

17. The processor of claim 13, wherein the reduction value is provided as a single value to be applied when the first IAB network topology is any one of a list of IAB network topologies.

18. The processor of claim 13, wherein the reduction value is to be applied for each backhaul link in the first IAB network topology, wherein the reduction value is further based at least on a number of backhaul links in the first IAB network topology.

* * * * *